United States Patent Office 3,538,540
Patented Nov. 10, 1970

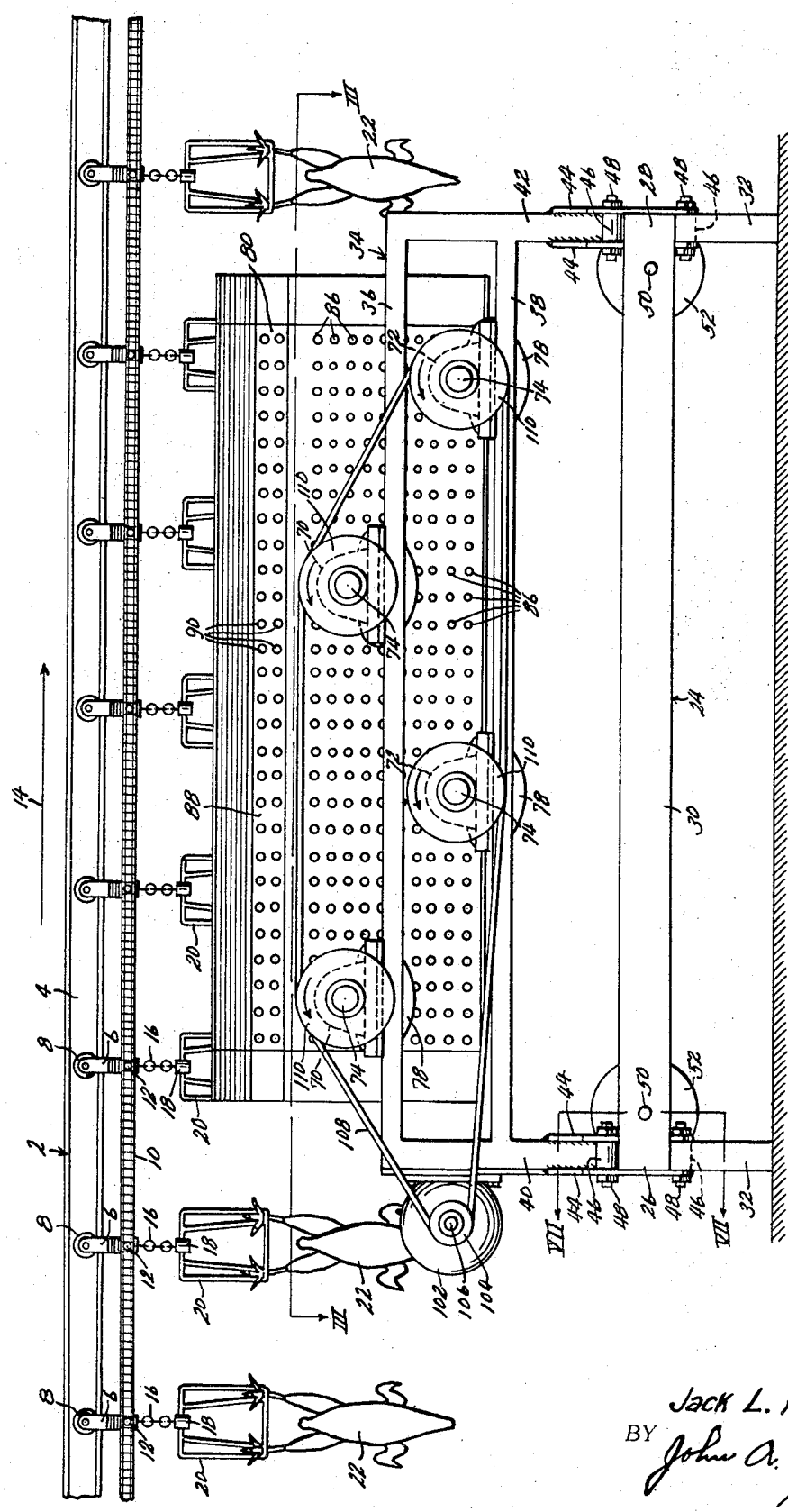

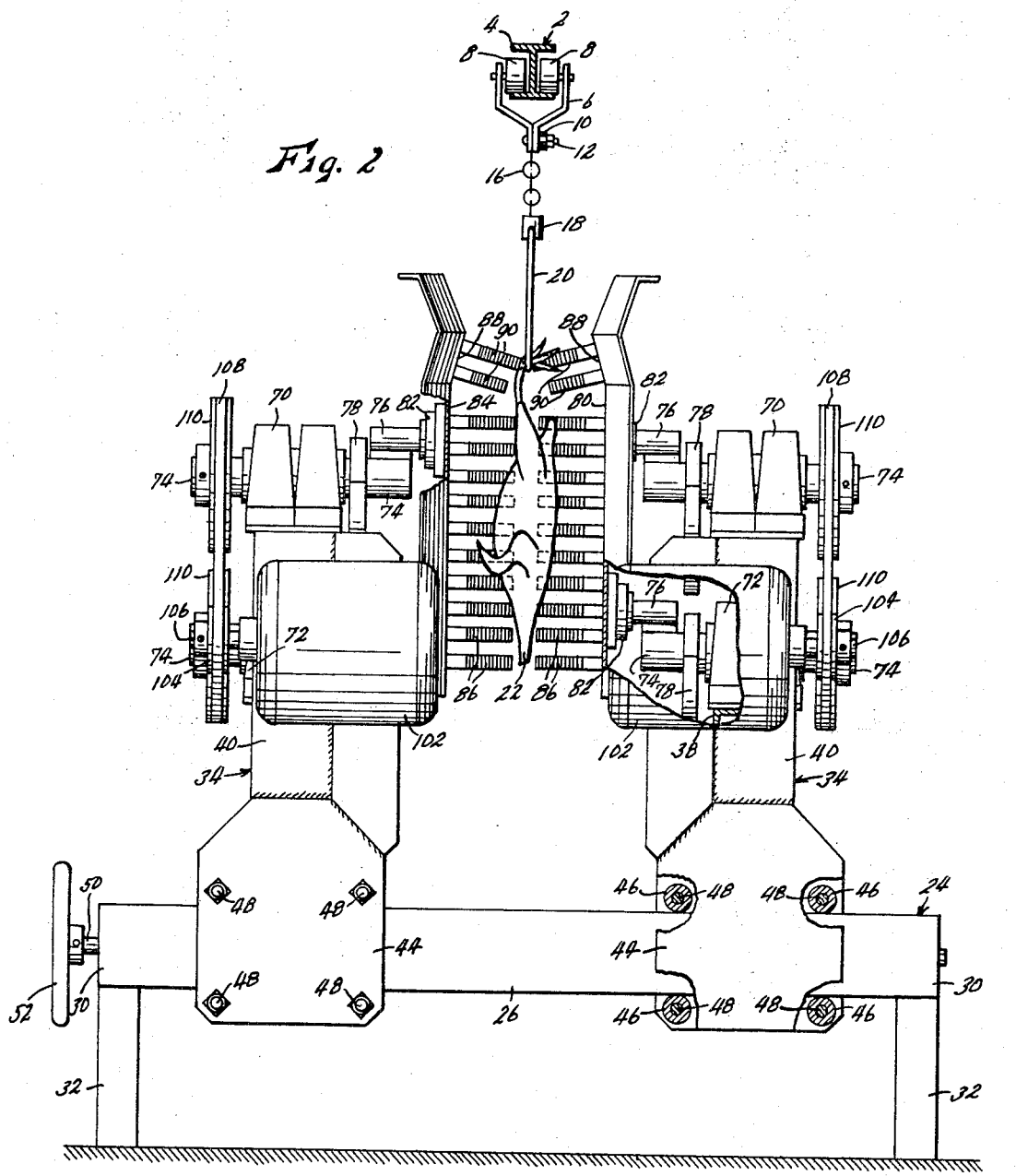

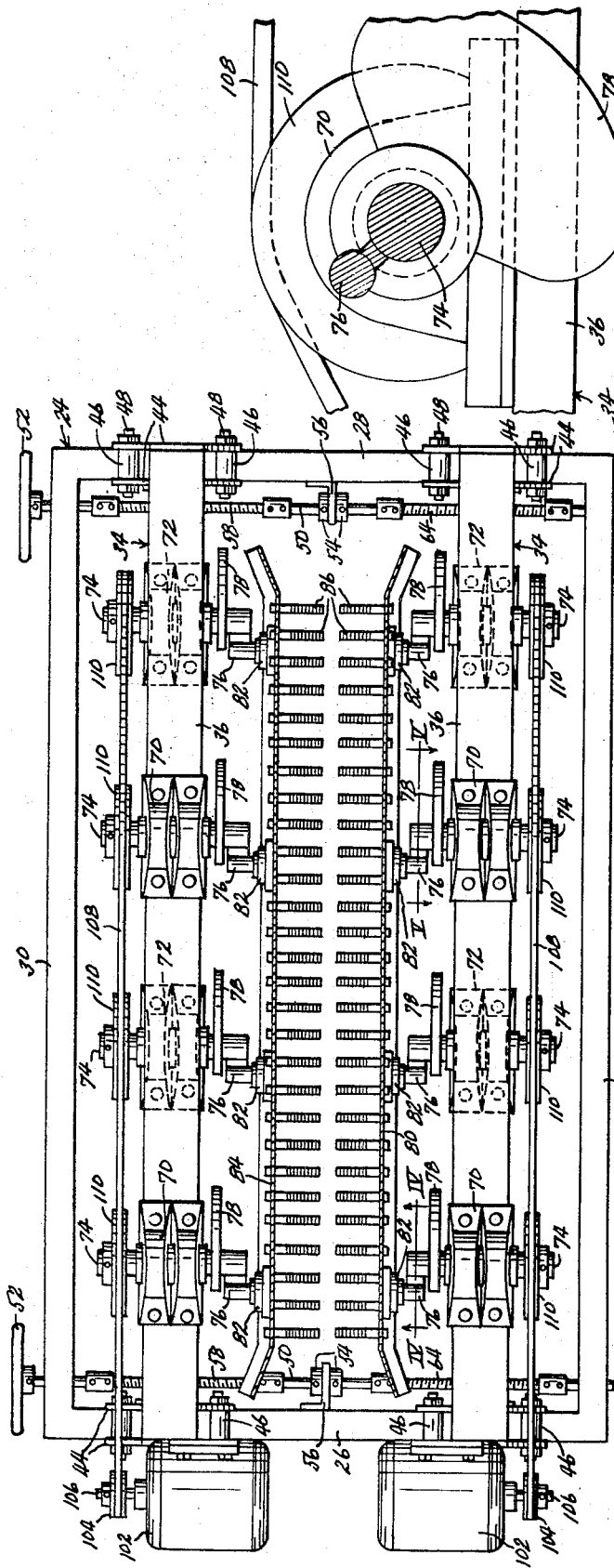

3,538,540
POULTRY DEFEATHERING APPARATUS
Jack L. Hathorn, Independence, Mo., assignor, by mesne assignments, to Gordon Johnson Company, Kansas City, Mo., a corporation of Missouri
Filed Feb. 14, 1968, Ser. No. 705,544
Int. Cl. A22c 21/02
U. S. Cl. 17—11.1                                13 Claims

ABSTRACT OF THE DISCLOSURE

An apparatus for defeathering poultry as the birds are suspended and moved along a generally horizontal path of travel by a conveyor, said apparatus comprising a pair of vertical, parallel plates disposed respectively at opposite sides of the vertical plane of said path of travel and extending parallel thereto, resilient picking fingers mounted in said plates and projecting toward said path, and means for orbiting each of said plates in a relatively small-diameter path about an axis normal to said plate and to said vertical plane of poultry travel.

---

This invention relates to new and useful improvements in poultry processing equipment, and has particular reference to that class of equipment used for removing feathers from the birds, commonly known as "poultry pickers."

Numerous types of poultry pickers have heretofore been devised and used. Generally, these pickers have involved rubber or otherwise flexible fingers mounted in rotatable mounting members disposed adjacent the path of travel of the birds. The mounting members may consist of drums rotatable about axes parallel to the path of poultry travel, or discs rotatable about axes disposed angularly to the path of poultry travel. The fingers project from their mounting members generally radially to their axis of rotation, so that once for each revolution of the mounting member, each finger intersects said path of travel to imping against any bird in its path, whereby to remove feathers therefrom.

Nevertheless, in all prior pickers of these types within my knowledge, certain problems have persisted and have been a constant source of trouble. For example, the feather removal is accomplished thereby principally by the initial "impact" or "blow" of each finger against the poultry carcass, any "drag" or "rubbing" of the finger against the carcass after the original impact tending to be of very light, and hence ineffective, pressure due to the tendency of fingers to rebound away from the carcass after the original impact. As a result, these pickers required a very high finger speed for efficient picking action, averaging perhaps at about 30,000 inches per minute. This high impact speed often "bruises" the birds, resulting in discoloration of the skin and downgrading of the bird, so that it can be sold only at a smaller profit. The high finger speed also often does other damage to the birds, such as breakage of wings, which further downgrades them and reduces their salability, many plants experiencing such damage in about 5–10% of its birds. Such damage is also made more common in many prior pickers by the close proximity therein of fingers moving in opposite directions, the counter-movement of fingers simultaneously engaging a fragile part of the bird, such as a wing, being easily capable of breaking the bones therein. The rapid finger movement also promotes rapid wear and breakage of the fingers themselves, the replacement of worn and broken fingers representing a major expense in poultry processing plants. Finger wear and breakage in prior pickers as described is further accentuated by at least two other factors. First, the wear is concentrated at the tip portion of the finger, since the tip portion engages the bird first, and since the base portions of the fingers may not engage the bird at all due to elastic rebound of the finger after the initial impact, and in any event do not have the requisite high speed since they are closer to the axes of rotation of the mounting members. Hence, in such machines, the wear is concentrated at the tip of the finger, and a finger is virtually useless and inoperative if the tip portion thereof breaks off. Furthermore, in all such prior pickers within my knowledge, only one longitudinal side or face of each finger receives virtually all of the wear, since only one face thereof, the leading face thereof in its direction of rotation, engages the bird. Hence the wear is concentrated not only along one longitudinal face of the finger, but also adjacent the tip of the finger as mentioned previously. Since finger wear and breakage costs the average poultry processing plant many thousands of dollars every year, it will be apparent that any picker which can reduce wear and breakage to a substantial degree is a valuable contribution to the art.

Accordingly, the principal object of the present invention is the provision of a defeathering apparatus or "picker" which while utilizing elongated flexible picking fingers of a standard type, nevertheless avoids to a substantial degree all of the above enumerated problems and difficulties, in that it avoids high-speed "impact" or "blows" of the fingers against the poultry carcasses, substituting therefor a rotary scrubbing action in which the fingers remain in constantly moving contact with the birds with full pressure for relatively long periods of time, which permits reduction of the finger speed to a small fraction, perhaps one-third, of that heretofore required, without sacrifice of picking efficiency and in fact with a definite improvement of said efficiency, which thus causes far less bruising, wing breakage or other damage to the birds than in other pickers, which further avoids bird damage by eliminating counter-movement of adjacent fingers, which permits full utilization of the entire effective lengths of the fingers, and which permits utilization of all of the longitudinal sides or faces of each finger.

Generally, this object is accomplished by affixing the fingers in mounting members constituting a pair of vertical plates extending parallel to the path of poultry travel, respectively at opposite sides of said path, the fingers projecting toward the vertical plane of said path of travel but not engaging the fingers of the opposite plate, and orbitally rotating each of said plates in a relatively small orbit about an axis normal to said plates.

Other objects are simplicity and economy of construction, efficiency and dependability of operation, and adaptability without tedious adjustments to function efficiently on poultry of a wide range of sizes.

With these objects in view, as well as other objects which will appear in the course of the specification, reference will be had to the accompanying drawing, wherein:

FIG. 1 is a side elevational view of a poultry defeathering apparatus embodying the present invention, shown in operative relationship to a poultry conveyor line, FIG. 2 is an enlarged elevational view of the entry end of the apparatus as shown in FIG. 1, with parts broken away, FIG. 3 is a sectional view taken on line III—III of FIG. 1, with the poultry carcasses omitted, FIG. 4 is an enlarged, fragmentary sectional view taken on line IV—IV of FIG. 3, FIG. 5 is an enlarged, fragmentary sectional view taken on line IV—IV of FIG. 3, FIG. 5 is an enlarged, fragmentary sectional view taken on line V—V of FIG. 3, FIG. 6 is an enlarged, fragmentary sectional view taken on line VI—VI of FIG. 4, showing one of the picking fingers and the mounting thereof, and FIG. 7 is an enlarged, fragmentary sectional view taken on line VII—VII of FIG. 1, with parts left in elevation.

Like reference numerals apply to similar parts throughout the several views, and the numeral 2 applies generally to a poultry conveyor of standard type, consisting of a rigidly fixed conveyor rail 4, a continuous series of spaced brackets 6 supported on said rail for movement therealong by rollers 8, and a conveyor chain 10 disposed beneath and parallel to rail 4 and affixed to each bracket 6 at 12. Said chain is driven by any suitable means, not shown, to move brackets 6 along rail 4 in the direction of arrow 14 in FIG. 1. Suspended from each bracket 6, by means of a chain 16 and swivel 18, is a poultry shackle 20. Each shackle is adapted to support a poultry carcass 22, usually engaging said carcass by the feet so that the carcass hangs vertically downwardly therefrom. The chain 16 and swivel 18 are not essential to the invention, but are desirable to permit each carcass to swing freely, and to turn about a vertical axis, as it passes through the defeathering apparatus, whereby to promote better picking as will be described.

The picking or defeathering apparatus forming the subject matter of the present invention includes a horizontal base 24 which is rectangular, consisting of a front rail 26, rear rail 28, and a pair of side rails 30, all rigidly joined, said base being supported at each corner by a floor-engaging leg 32. Said base is disposed directly beneath conveyor 2, its longitudinal midline lying in the vertical plane of the path of travel of the poultry carried by said conveyor.

Base 24 carries a pair of frames each designated generally by the numeral 34, said frames being disposed respectively at opposite sides of the path of poultry travel. Each frame includes an upper bar 36 and a lower bar 38 which extend horizontally and longitudinally of base 24, being affixed at their forward ends to a front leg 40 and at their rearward ends to a rear leg 42 (see FIG. 1) said front and rear legs being disposed respectively immediately above front and rear rails 26 and 28 of the base. Affixed to the lower end of each of said front and rear legs are a pair of plates 44, said plates extending downwardly respectively at the inner and outer sides of the associated base rail 26 or 28. A plurality of rollers 46 are rotatably mounted between each pair of plates 24 on bolts 48, certain of said rollers engaging the upper surfaces of rails 26 and 28, and certain of said rollers engaging the lower surfaces of said rails, whereby frames 34 are positively supported but may be moved toward or from each other transversely of base 24. Said frames may be moved in this manner by a pair of shafts 50 extending transversely of base 24 respectively adjacent each end of said base, and rotatively journaled in side rails 30 of said base. Each shaft is provided at one of its extended ends with a handwheel 52 by means of which it may be turned. As best shown in FIGS. 3 and 7, each shaft 50 is prevented from moving longitudinally by a pair of collars 54 affixed thereon and abutting opposite sides of a bracket 56 affixed to the adjacent end rail 26 or 28 of the base, is provided with a right-hand threaded section 58 engaged in a nut 60 affixed in a bracket 62 in turn affixed to the inner plate 44 of one of the frame legs supported by the adjacent end rail of the base, and a left-hand threaded section 64 engaged in a nut 66 affixed in a bracket 68 in turn affixed to the inner plate 44 of the other frame leg supported by the adjacent end rail of the base. Thus, by turning handwheels 52, the frames 34 may be moved closer to or farther from the vertical plane of poultry travel, but will always be spaced equally at opposite sides of said plane.

A pair of bearings 70 are mounted on the top bar 36 of each frame 34, and a pair of bearings 72 are mounted on the lower bar 38 of each frame 34, bearings 70 and 72 being spaced along the lengths of said frame bars in staggered relation, as best shown in FIG. 1, and each bearing supports a shaft 74 rotatably therein, the axes of all of said shafts being parallel, horizontal, and transverse to the longitudinal extent of base 24. The inwardly extended end of each shaft 74 has an eccentrically offset crankshaft 76 affixed rigidly thereto and extending therefrom toward the opposite side of the machine. The degree of eccentricity of all of said crankshaft is identical. Also affixed to each shaft 74, inwardly of its bearing, is an eccentric counterweight 78, the center of gravity of said counterweight being offset from the axis of shaft 74 in diametrically opposite relation to the offset of crankshaft 76.

The crankshafts 76 carried by the right frame 34, as viewed when looking in the direction of poultry travel, carry a finger-mounting member constituting a large vertically disposed plate 80 extending parallel to the direction of poultry travel, or longitudinally of base 24. Horizontally, said plate extends substantially the full length of base 24, and vertically, it should extend the full vertical height of the largest birds likely to be picked by the machine. The crankshafts 76 of right frame 34 are each journaled rotatably in a bearing 82 affixed to the outer surface of plate 80. The angular position of all of said crankshafts is identical. Similarly, a second finger-mounting plate 84 is carried by the crankshafts 76 of the shafts 74 supported by left frame 34.

Each of plates 80 and 84 has a large number of picking fingers 86 mounted therein and extending normally therefrom toward the other of said plates, although the plates are spaced sufficiently far apart that the fingers of one do not touch or intermingle with those of the other. The upper edge portions 88 of both of plates 80 and 84 are angled slightly toward each other, as best shown in FIG. 2, and additional fingers 90 are mounted in these angled portions, said fingers consequently being angled inwardly and downwardly for a purpose to be described below.

The specific formation and mounting of each finger 88 and 90 is subject to wide variation within the concept of the present invention, but is shown in exemplary form in FIG. 6. It is elongated, formed of rubber or other suitable flexible and resilient material, has a base portion 92 in which is formed a peripheral groove 94 by means of which the finger may be secured in a hole 96 formed in the mounting plate by putting said finger forcibly through said hole until the plate engages in said groove as shown, and an operative portion 98, constituting the major portion of the length thereof, with ridges 100 formed peripherally thereabout. The cross-sectional contour of the finger may be round, square, rectangular, oval or otherwise, as may be desired.

An electric motor 102 is mounted on the front leg 40 of each frame 34, and a pulley 104 is fixed on the drive shaft 106 of each motor. The pulley 104 of the motor carried by each frame is operably connected by means of a belt 108 with pulleys 110 mounted on the outwardly extended ends of each of the shafts 74 carried by that frame. All of the shafts 74 of both frames are driven in the same direction, so that both of plates 80 and 84 orbit in the same direction viewed from one side only of the machine. It is desirable that the plates orbit in a counter-clockwise direction as viewed in FIG. 1 and indicated by the directional arrows on pulleys 110, so that said plates are moving downwardly when the plates are orbited toward the approaching poultry. This insures that the carcasses are first engaged by fingers 88 which are moving downwardly and then forwardly in the direction of travel. This pulls the carcasses surely into the space between the plates 80 and 84. If the orbiting direction were opposite or clockwise, the approaching carcasses would first be engaged by upwardly moving fingers, which could cause said carcasses to be flipped upwardly rather than entering properly between the plates. Actually, all of the shafts 74 of each plate must rotate in unison, since they are all connected to the plate. Hence it is possible to connect the driving motor to only one of pulleys 110. However, driving all of the shafts as shown has been found to reduce possible vibration of the entire machine due to the eccentric orbiting of the considerable mass of the plates 80 and 84 and the fingers carried thereby. The primary balancing of this eccentrically orbiting mass is of course provided by counterweights 78.

In operation, motors 102 are actuated to set fingermounting plates 80 and 84 in orbiting motion, and conveyor 2 is actuated to carry poultry carcasses 22 between said plates, where they are engaged by fingers 88 to remove feathers therefrom. The resilient flexibility of the fingers of each plate tends to press each carcass into fingers of the other plate, thereby insuring good contact therebetween. The action of the fingers against the carcasses is largely a rotary scrubbing action, since the plates do not carry the fingers alternately away from and toward the carcasses to deliver impact blows to said carcasses, as is the case with the usual drum or disc pickers. This scrubbing action has been found not only to perform better and more efficient picking, providing considerably cleaner and better-picked birds in a machine of the same length as compared to drum or disc pickers, but also to be far less likely to bruise, break wings or otherwise damage the birds. The reduction of carcass damage is further enhanced by the fact that all of the fingers 86 at each side of the path of travel of the bird move in the same direction, not having the counter or opposite directions of movement as is the case in disc pickers and some drum-type pickers. Such counter-movement of closely adjacent fingers is a common cause of wing breakage. Moreover, the generally planar configuration of plates 80 and 84, with the fingers distributed evenly over substantially the entire areas thereof provides a continuous, uninterrupted picking area to which the carcasses are uniformly exposed during their entire time in the machine. In drum and disc pickers in which the fingers rotate about axes such that they engage the birds only during a limited portion of their paths, the effective picking areas are always intermittent or non-continuous, therefore requiring longer machines for comparable picking efficiency.

In the scrubbing action of the fingers, it will be seen that if the orbiting radius of each finger is sufficiently small, the high speed of orbiting, perhaps 500 r.p.m., as compared to the linear speed of movement of the birds along the conveyor, will cause each finger to remain in nearly continuous contact with each carcass as long as said carcass is within range of said finger, with very little impact action of said finger against the carcass. This increases the efficiency of the scrubbing action. A larger orbit would decrease the time each finger remained in contact with each bird, decreasing the efficiency of the scrubbing action, and would also increase the impact action of the fingers against the birds, which would in turn increase the chances of physical damage to the birds. For this reason, as well as for one other principal reason to be described, it is essential that the orbiting radius of plates 80 and 84 be rather severely restricted. While the precise radius selected could depend on several factors, such as the size of the birds being picked and the conveyor speed, and while this radius could be selected as might be dictated by particular circumstances, it has been found that in most instances a radius of about three inches, or a diameter of six inches, will provide a good scrubbing action with a minimum of impact action. In other words, the diameter of orbit should generally be no greater than the horizontal thickness of the birds being picked.

The second principal reason for restricting the orbiting radius of the finger plates is that for an efficient scrubbing action, it will be apparent that the movement of the birds themselves must not be appreciably affected by the action of the fingers thereagainst. In this manner the relative movement of the fingers against the birds, which is the essence of the scrubbing action, is preserved. If the orbits were larger, the fingers would move in the same general direction for longer periods of time, overcoming the inertia of the birds and causing them to move with the fingers and tending to defeat the scrubbing action. However, if the orbiting radius is sufficiently small, the direction of movement of the fingers against the birds changes so rapidly that the mass and inertia of the birds prevent them from moving with the fingers, whereby to preserve the scrubbing action. Again, the specific radius most effective will depend on such factors as the weight of the birds and the speed of orbiting, but the three-inch radius suggested above, with an orbiting speed of 500 r.p.m. has been found effective even with very light birds such as chickens.

It will be seen that so long as plates 80 and 84 are properly spaced apart by turning handwheels 52, each finger 86 may be so far deflected by the presence of a carcass 22 adjacent thereto that the entire length of the operative portion 98 thereof is brought to bear against the carcass so as to be effective in removing feathers therefrom. This obviously produces an increase in picking efficiency as compared to impact-type pickers such as drums and discs, wherein only the outer tip portions of the fingers are actually effective, and moreover provides that the finger will remain at least partially operative even if the tip portion thereof should break off, which is not true in impact-type pickers. Also, this feature provides for greater adaptability of the pickers, without adjustment, to birds of different sizes. For example, while optimum efficiency might dictate a very close setting of plates 80 and 84 for small birds, in order to utilize the full length of the operative portions of the fingers, practice has shown that it is permissible to set the plates for the largest birds likely to be encountered in a given run. Smaller birds will then deflect the fingers to a lesser degree, utilizing only lesser lengths of the operative portions of the fingers, but the smaller birds, being of smaller area, require less finfier action and are hence still efficiently picked. Thus the machine can, with a single setting of plates 80 and 84, pick birds of a wide range of sizes, so that often the only times handwheels 52 are used is to space the plates far apart to facilitate cleaning and servicing of the machine. The birds of course swing freely on chains 16 and rotate on swivels 18 as they pass through the machine, so that all portions thereof are presented to the fingers.

Due to the picking efficiency of the scrubbing action resulting from its rotary action, long-time finger contact with the birds, and full utilization of the lengths of the fingers, it has been found quite acceptable to reduce the finger speed substantially as compared to that heretofore considered necessary in the usual drum and disc pickers, without sacrifice of picking efficiency. For example while drum and disc pickers, with their impact picking action, have required a finger-tip speed averaging perhaps 30,000 inches per minute, the present picker provides even a superior picking efficiency with a finger speed of about 10,000 inches per minute. This lower speed contributes to a gentler or softer picking action with less bird damage and longer finger life.

Longer finger life is enhanced not only by the lower finger speed and utilization of the entire lengths of the operative portions of the fingers, as already discussed, but also by the fact that, due to the orbital movement of the fingers, all of the longitudinal faces of each finger are presented progressively to and move against the carcasses in each orbit of said finger, so that wear thereof, is distributed evenly around the entire circumference of said finger. This is not the case with the fingers of the usual drum and disc pickers, wherein one longitudinal face of each finger makes virtually all of the contact of said finger with the carcasses, and suffers virtually all of the wear. It is conservatively estimated that the life of a finger in the present device will be at least double the life of a comparable finger in the usual drum and disc pickers.

The purpose of fingers 90 which are inclined inwardly and downwardly from the upper edge portions 88 of plates 80 and 84 as shown in FIG. 2, is to defeat any possible tendency of the birds to be raised above fingers 86 by the action of said fingers, which would cause the carcasses to be dragged along the upper rows of fingers 86 with little or no picking being performed thereon. Fingers 90, due to their inclination, exert a downward force on the carcasses when necessary, to hold them between fingers 86. Actually, there is usually very little tendency of the birds to be lifted, due to their inertia and the rapid change of direction of movement of the fingers relative thereto, as previously described. Nevertheless, such a tendency may occasionally be manifest, as for example if opposed fingers of the plates 80 and 84 should happen to move in exact coincidence or phase for any substantial length of time, whereupon their combined upward forces on a bird during their upstrokes might lift the bird. In this connection, such a lifting action would be at most be only momentary, since even if motors 102 both were nominally of the same speed, and even if drive pulleys 104 and 110 associated with each plate 80 and 84 were nominally equal, there would almost unavoidably be sufficient actual inequality that the two plates 80 and 84 would seldom be orbiting exactly in phase. The tendency could be rendered still smaller by deliberately orbiting the two plates at slightly different speeds, as by altering the rotational speeds of motors 102, or the relative diameters of pulleys 104.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. An apparatus for defeathering poultry as the poultry carcasses are moved along a generally horizontal path of travel within a vertical plane by a conveyor, said apparatus comprising:
   (a) a supporting structure,
   (b) a pair of finger-mounting members carried movably by said supporting structure and maintained respectively in single vertical planes at opposite sides of the path of travel of said poultry and generally parallel to said path,
   (c) flexible, elongated picking fingers having their base ends secured in said mounting members and extending therefrom toward said vertical plane of the path of travel of said poultry, and
   (d) operating means carried by said supporting structure and operable to drive each of said finger-mounting members in an orbital path within its own plane and to said vertical plane of poultry travel, about axes normal to said planes.

2. An apparatus as recited in claim 1 wherein the diameter of orbital movement of each of said finger-mounting members is restricted to a dimension generally equal to or less than the horizontal thickness of the poultry carcasses passing therebetween.

3. An apparatus as recited in claim 1 wherein diameter of orbital movement of each of said finger mounting members is no greater than about six inches.

4. An apparatus as recited in claim 1 wherein said fingers project generally horizontally from said finger-mounting members toward said vertical plane of poultry travel.

5. An apparatus as recited in claim 1 wherein a major portion of said fingers project horizontally from said finger-mounting members toward said vertical plane of said path of poultry travel, and wherein certain of the fingers of each of said finger-mounting members, along the upper edge thereof, are inclined downwardly toward said vertical plane of poultry travel.

6. An apparatus as recited in claim 1 wherein said operating means comprises:
   (a) a series of spaced apart shafts carried by said supporting structure adjacent each of said finger-mounting members for rotation about axes normal to the plane of said finger-mounting member, each of said shafts having a radially offset crankshaft affixed thereto and connected to said finger-mounting member for rotation relative thereto about its axis, said crankshafts all having equal throws and being angularly in phase, and
   (b) means for rotating at least one of the shafts associated with each of said finger-mounting members.

7. An apparatus as recited in claim 1 wherein said fingers of both finger-mounting members terminate at their projecting ends short of said vertical plane of said path of poultry travel, whereby there is no contact between the fingers of the respective mounting members.

8. An apparatus as recited in claim 1 with the addition of means carried by said supporting structure and operable to adjustably vary the spacing between the vertical planes of said finger-mounting members.

9. An apparatus as recited in claim 1 wherein said supporting structure comprises:
   (a) a base,
   (b) a pair of frames carried movably by said base, one of said finger-mounting members being carried by each of said frames, and
   (c) means carried by said base and operable to move said frames adjustably on said base in a direction transverse to the planes of said finger-mounting members.

10. An apparatus as recited in claim 9 wherein said operating means includes a pair of prime movers mounted respectively on said frames and each operable to drive the finger-mounting member associated with that frame.

11. A poultry defeathering apparatus comprising:
    a pair of horizontally spaced members disposed in parallel planes and each provided with a plurality of inwardly extending, flexible, feather-picking fingers; and
    parallel linkage supporting each member respectively for orbital movement of the members and for maintaining said members within said planes thereof, said linkage maintaining the members equally spaced during the orbital movement of the members.

12. The invention of claim 11, wherein said members are elongated and provided with longitudinal axes that are maintained substantially horizontal by the linkage during said orbital movement.

13. The invention of claim 12, wherein said planes are vertical and the members are provided with transverse axes that are maintained substantially vertical during said orbital movement.

References Cited
UNITED STATES PATENTS

| | | | |
|---|---|---|---|
| 1,907,665 | 5/1933 | Prouty et al. | 56—14 |
| 2,743,477 | 5/1956 | Barker et al. | 17—11.1 |
| 2,759,216 | 8/1956 | Sharp | 17—11.1 |
| 3,277,515 | 10/1966 | Engkjer et al. | 17—11.1 |

LUCIE H. LAUDENSLAGER, Primary Examiner